(12) United States Patent
Chen

(10) Patent No.: US 10,946,811 B1
(45) Date of Patent: Mar. 16, 2021

(54) VEHICLE-MOUNTED MOBILE PHONE HOLDER

(71) Applicant: Qi Qun Chen, Hunan (CN)

(72) Inventor: Qi Qun Chen, Hunan (CN)

( * ) Notice: Subject to any disclaimer, the term of this patent is extended or adjusted under 35 U.S.C. 154(b) by 0 days.

(21) Appl. No.: 16/731,091

(22) Filed: Dec. 31, 2019

(30) Foreign Application Priority Data

Dec. 17, 2019 (CN) .......................... 201922219176.7

(51) Int. Cl.
 *B60R 11/02* (2006.01)
 *H04B 1/3877* (2015.01)
 *B60R 11/00* (2006.01)

(52) U.S. Cl.
 CPC ........ B60R 11/0241 (2013.01); H04B 1/3877 (2013.01); *B60R 2011/0003* (2013.01); *B60R 2011/0075* (2013.01); *B60R 2011/0082* (2013.01)

(58) Field of Classification Search
 CPC ......... B60R 11/0241; B60R 2011/0071; B60R 2011/0075; B60R 2011/0059; B60R 2011/0003; B60R 2011/005; B60R 2011/0082; B60R 7/08; H04B 1/3877; H04B 1/3888
 See application file for complete search history.

(56) References Cited

U.S. PATENT DOCUMENTS

| | | | |
|---|---|---|---|
| 2012/0140386 A1* | 6/2012 | Zhao .................... | G11B 33/022 361/679.01 |
| 2018/0252358 A1* | 9/2018 | Yang ..................... | F16M 13/00 |
| 2020/0130604 A1* | 4/2020 | MacNeil ................ | H04M 1/04 |

* cited by examiner

*Primary Examiner* — Nhan T Le

(57) ABSTRACT

A vehicle-mounted mobile phone holder includes a holder body, and a fixing base, the fixing base is connected with the holder body and cooperates with a slot for placing water cup on the side of the driving position. The disclosure adopts the design of a fixing seat, which places the fixing seat in a slot for placing water cup, and fixes the holder through the slot for placing water cup, which greatly facilitates the fixing of the holder. At the same time, this solution also designs a size adjusting sleeve to adjust the size, the design of the sleeve makes the holder suitable for different models, moreover, the product can be rotated 360 degrees around the slot, which greatly facilitates the use of the user.

15 Claims, 5 Drawing Sheets

VEHICLE-MOUNTED MOBILE PHONE HOLDER

CROSS REFERENCE TO RELATED APPLICATION

The present application claims priority to and the benefit of Chinese Patent Application No. 201922219176.7 filed on Dec. 17, 2019, the contents of which are hereby incorporated by reference.

TECHNICAL FIELD

The disclosure relates to the field of mobile phone peripheral equipment, in particular to a vehicle-mounted mobile phone holder.

BACKGROUND

The vehicle-mounted mobile phone holder is flexible and convenient to use. Among them, the magnetic mobile phone holder has some advantages, for example, pick and place convenient, no noise, and universal size of the mobile phone. It is suitable for all mobile phones, PDA, MP4, smart phone, GPS positioning and navigation equipment in the market. It can be placed at various angles and rotated 360 degrees to choose different visual directions. The appearance of them is new and unique, and your car is decorated by them. It adopts a large powerful suction cup, which can be stably fastened on the windshield, and can also be installed on the air outlet of the air conditioner and the front desk of the car. The support frame is strong and powerful, will not be shaken or fell, and can be adjusted in angle. It can be used on cars and tables with different clamps. Among them, the creative holder shaped like a clock is a creative holder, which is both a holder and a car decoration, which is the best choice for every car owner.

However, this fixing installation method is not reliable. When the vehicle is bumpy, it is easy for the mobile phone to fall off from the holder. In addition, only one the holder can be installed on a car. When the passenger at the front passenger's seat needs to charge the mobile phone, the mobile phone is generally randomly placed at the water cup placement slot, which is very inconvenient.

Therefore, there is an urgent need on the market for a vehicle-mounted mobile phone holder capable of solving one or more of the above problems.

SUMMARY

In view of the defects of the prior art, the disclosure aims to provide a vehicle-mounted mobile phone holder.

The technical scheme disclosed by the disclosure to achieve the above-mentioned object is: vehicle-mounted mobile phone holder, the vehicle-mounted mobile phone holder comprising a holder body; and a fixing seat is connected to the holder body and cooperates with a slot for placing water cup on the side of the driving position.

In some embodiments, the fixing base further comprises at least one size adjusting sleeve, the size adjusting sleeve is arranged outside the fixing base and is configured to adjust the outer diameter of the fixing base.

In some embodiments, the size adjusting sleeve is provided with at least one force groove for facilitating removal of the size adjusting sleeve.

In some embodiments, the force groove is provided on a bottom surface or a side surface of the size adjusting sleeve.

In some embodiments, the force groove is oval.

In some embodiments, the holder body and the fixing base are rotationally connected.

In some embodiments, the holder body comprises bottom shell, a cover, the cover and the bottom shell cooperate to form a installation chamber therebetween; a longitudinal clamping jaw, one end of the longitudinal clamping jaw is disposed in the installation chamber, and the other end protrudes outside the installation chamber, and is configured to support the bottom of the mobile phone placed vertically; at least two lateral clamping jaws, one end of the lateral clamping jaw is disposed in the installation chamber to cooperate with the longitudinal clamping jaw, and the other end protrudes out of the installation chamber to clamping the side wall of the mobile phone; and a position restorating device, which is disposed between the longitudinal jaw and the installation chamber, and is configured to apply a force retracting toward the installation chamber to the longitudinal jaw protruding out of the installation chamber; or the position restorating device is arranged between the lateral clamping jaw and the installation chamber, and is configured to apply a force retracting toward the installation chamber to the longitudinal clamping jaw protruding out of the installation chamber; when the mobile phone is placed on the longitudinal clamping jaw, under the effect of the weight of the mobile phone, the longitudinal clamping jaw is driven to move downward, and the lateral clamping jaw is clamped inward to clamp the side wall of the mobile phone; when the mobile phone is removed, under the effect of the position restorating device, the longitudinal jaw moves upward and retracts into the installation chamber.

In some embodiments, a first through slot is provided in the longitudinal clamping jaw along a longitudinal direction of the longitudinal clamping jaw and cooperates with a screw mounting column in the installation chamber to be longitudinally movement along the screw mounting column.

In some embodiments, a first clamping post is provided at the connection between the upper end of the longitudinal clamping jaw and the lateral clamping jaw; a second clamping post is provided at the a connection where the installation chamber and the lateral clamping jaw cooperate; a second through groove matching the first clamping post is provided on the lateral clamping jaw, a third through groove that is matched with the second clamping post is provided on the lateral clamping jaw; when the longitudinal clamping jaw moves downward, the lateral clamping jaw is clamped inward with the cooperation of the first clamping post, the second clamping post, the second through groove and the third through groove.

In some embodiments, wherein the position restorating device comprises a first magnet is disposed on the longitudinal clamping jaw; a second magnet disposed on an inner side wall of the cover, opposite poles of the second magnet and the first magnet are opposite poles; and a third magnet, the third magnet being disposed on an inner side wall of the cover and directly below the second magnet; opposite poles of the third magnet and the first magnet are the same poles; when the longitudinal clamping jaw moves downward, the first magnet and the third magnet are oppositely disposed. Due to the same polarity repulsion, when the mobile phone is removed, the longitudinal clamping jaw moves upward under the effect of the repulsive force, and finally the longitudinal clamping jaw is retracted into the installation chamber under the effect of the first magnet and the second magnet.

In some embodiments, the cover is provided with a second magnet mounting groove and a third magnet mounting groove matched with a second magnet and a third magnet respectively.

In some embodiments, after the longitudinal clamping jaw moves down into position, the axes of the third magnet (not shown) and the first magnet are not on the same straight line, and the axis of the third magnet is located below the axis of the first magnet.

In some embodiments, the longitudinal clamping jaw is provided with a first magnet mounting groove that cooperates with the first magnet.

In some embodiments, the first magnet mounting groove is provided on a side of the front jaw opposite to the bottom shell.

In some embodiments, at least one reinforcing rib is provided inside the cover.

In some embodiments, a buffer layer is provided on an outer surface of the cover.

In some embodiments, the position restorating device is a spring disposed between the longitudinal jaw and the installation chamber, and is configured to apply a retracted force to the longitudinal jaw to retract into the installation chamber.

The beneficial effect of the present disclosure is that the present disclosure adopts the design of a fixing base, which places the fixing base in a slot for placing water cup, and fixes the holder through the slot, which greatly facilitates the fixing of the holder. The size adjusting sleeve, through the design of the size adjusting sleeve, makes the holder suitable for different models. Moreover, the product can rotate 360 degrees around the slots, which greatly facilitates the use of the user.

DETAILED DESCRIPTION OF EMBODIMENTS

In order to make the above objects, features, and advantages of the present disclosure more comprehensible, embodiments of the present disclosure are described in detail below with reference to the accompanying figures. Numerous details are set forth in the following description in order to fully understand the present disclosure. However, the present disclosure can be implemented in many other ways than those described herein, and those skilled in the art can make similar improvements without departing from the content of the present disclosure, so the present invention is not limited by the embodiments disclosed below.

Figure 1:
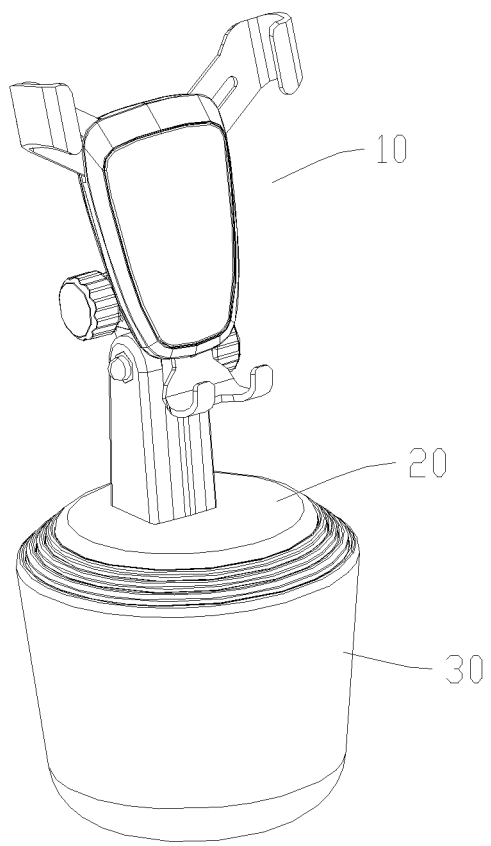
FIG. 1 is a structural diagram of a vehicle-mounted mobile phone holder in accordance with an embodiment of the present disclosure.
Figure 2:
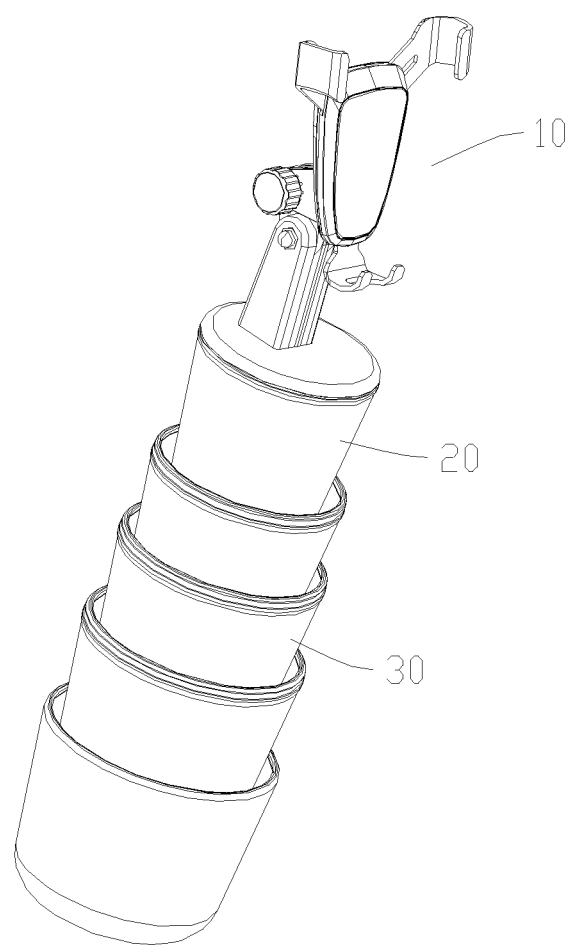
FIG. 2 is an exploded view of a partial structure of a fixing base and a size adjusting sleeve in a vehicle-mounted mobile phone holder in accordance with an embodiment of the present disclosure.
Figure 3:
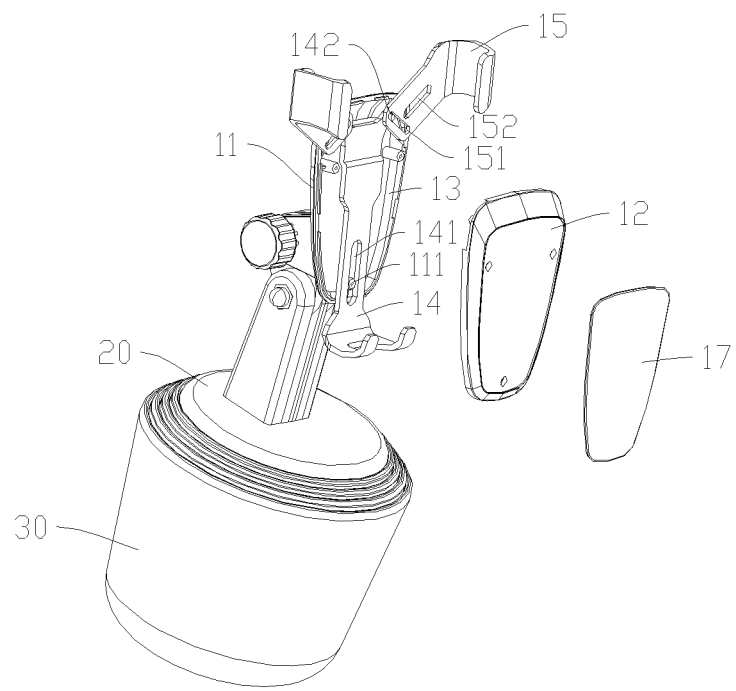
FIG. 3 is an exploded view of a partial structure of a holder body in a vehicle-mounted mobile phone holder in accordance with an embodiment of the present disclosure.
Figure 4:
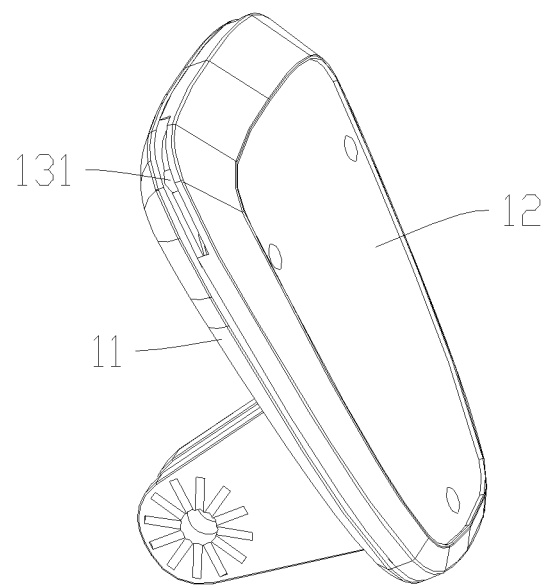
FIG. 4 is a structural diagram of an assembly structure of a cover and a bottom shell in a vehicle-mounted mobile phone holder in accordance with an embodiment of the present disclosure.
Figure 5:
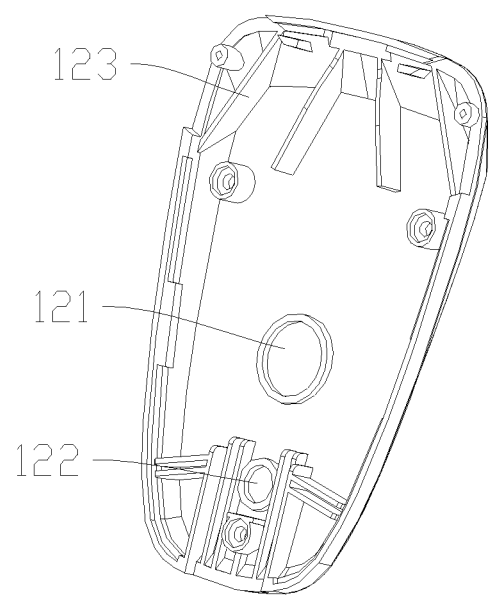
FIG. 5 is a structural diagram of an internal structure of the cover in a vehicle-mounted mobile phone holder in accordance with an embodiment of the present disclosure.
Figure 6:
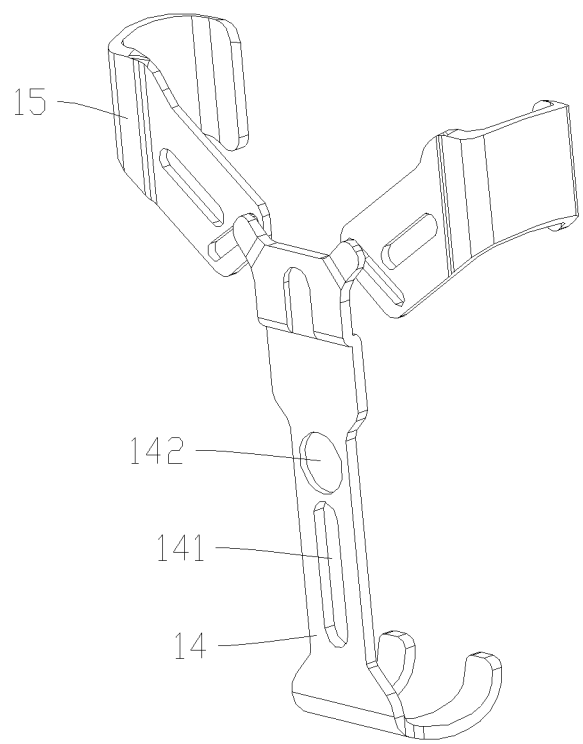
FIG. 6 is a structural diagram of an assembly structure of a longitudinal clamping jaw and a lateral clamping jaw in accordance with an embodiment of the present disclosure.

As shown in FIG. 1 to FIG. 3, the embodiment discloses a vehicle-mounted mobile phone holder. The holder includes:

A holder body 10 and a fixing base 20. The fixing base 20 is connected to the holder body 10, and cooperates with a slot for placing water cup on the side of the driving position.

Further, a shape of the fixing base 20 is cylindrical, which fits into the slot for placing water cup on the side of the driving position. Since there are generally two slots for placing water cup on the side of the driving position, generally, a usage rate of the slot is less than 50% by a drive That is, there is basically a vacant slot for placing water cup.

In the embodiment, according to above feature, a cylindrical fixing base 20 is designed. When in use, the fixing base 20 is placed in the slot for placing water cup for fixing. After the fixing is completed, the mobile phone is clamped on the holder body 10 to complete the fixing of the mobile phone in the car.

This method prevents the mobile phone from being placed anywhere in the car and achieves a positioning function. At the same time, when the passenger at the front passenger's seat needs to charge the mobile phone, the mobile phone can be fixing to the holder body for convenient charging.

In some embodiments, the fixing base 20 further includes:

At least one size adjusting sleeve 30 is provided on the outside of the fixing base 20 for adjusting the outer diameter of the fixing base 20.

In the embodiment, the size adjusting sleeve 30 is added. When the vehicle models are different, the sizes of the slot for placing water cup are also different. In this situation, the size adjusting sleeve 30 can be used for adjustment.

It should be noted that the size adjusting sleeves 30 are generally four to six, one after the other on the outside of the fixing seat 20, and are adjusted according to the actual size of the slot, which greatly facilitates the use of different vehicle models.

Figure 7:
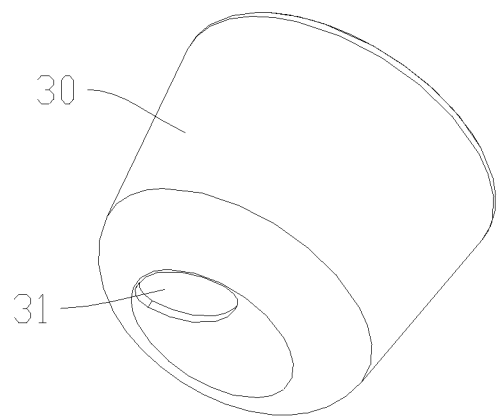
FIG. 7 is a structural diagram of the size adjusting sleeve in accordance with an embodiment of the present disclosure.

As shown in FIG. 7, the size adjusting sleeve 30 is provided with at least one force groove 31 which is convenient for removing the size adjusting sleeve 30.

Therefore, the connection between the size adjusting sleeves 30 is generally relatively tight, and it is a bit troublesome to remove them. In the solution, the force groove 31 is designed. This makes it easier to remove the size adjusting sleeve 30.

In some embodiments, the force groove 31 is disposed on a bottom surface or a side surface of the size adjusting sleeve 30.

In some embodiments, the force groove 31 is oval.

In some embodiments, the holder body 10 and the fixing base 20 are rotatably connected.

Therefore, in the embodiment, the holder body 10 and the fixing base 20 are connected by rotation, which greatly facilitates the angle adjustment of the mobile phone.

As shown in FIG. 3 to FIG. 6, the holder body 10 includes bottom shell 11; a cover 12, there is the cover 12 and the bottom shell 11 cooperate with each other to form a installation chamber 13 there between; a longitudinal clamping jaw 14, one end of the longitudinal clamping jaw 14 is disposed in the installation chamber 13, and the other end of the longitudinal clamping jaw 14 protrudes out of the installation chamber 13 for supporting the bottom of the mobile phone which is placed vertically; at least two lateral clamping jaws 15, one end of the lateral clamping jaw 15 is disposed in the installation chamber 13 to cooperate with the longitudinal clamping jaw 14, and the other end the lateral clamping jaw 15 protrudes outside the installation chamber 13 for clamping the side wall of the mobile phone; and a position restorating device (not shown in the figure), the position restorating device (not shown in the figure) is provided between the longitudinal jaw 14 and the installation chamber 13, which is used to extend out of the installation chamber 13. The position restorating device is used to apply a force to retract the longitudinal jaw 14 protruding out of the installation chamber 13 toward the installation chamber 13, or the position restorating device (not shown in the figure) is disposed between the lateral clamping jaw 15 and the installation chamber 13 for applying a force that retracts toward the inside of the installation chamber 13 by applying the longitudinal jaws 14 protruding outside the installation chamber 13.

When the mobile phone is placed on the longitudinal jaws 14, under the effect of the weight of the mobile phone, the longitudinal jaws 14 is driven to move downward, and the lateral jaws 15 is clamped inward to clamp the side wall of the mobile phone. Under the effect of the position restorating device (not shown in the figure), the longitudinal jaw 14 moves upward and retracts into the installation chamber 13.

In some embodiments, a first through slot 141 is provided in the longitudinal clamping jaw 14 along a longitudinal direction of the longitudinal clamping jaw 14 and cooperates with the screw mounting column 111 in the installation chamber 13 to be longitudinally movement along the screw mounting column 111.

In some embodiments, a first clamping post 142 is provided at a connection between the upper end of the longitudinal clamping jaw 14 and the lateral clamping jaw 15. A second clamping post 131 is provided at the connection where the installation chamber 13 and the lateral clamping jaw 15 cooperate. A second through groove 151 that is matched with the first clamping post 142 is provided on the lateral clamping jaw 15, A third through groove 152 that is matched with the second clamping post 131 is provided on the lateral clamping jaw 15.

When the longitudinal clamping jaw 14 moves downward, the lateral clamping jaw 15 is clamped inward with the cooperation of the first clamping post 142, the second clamping post 131, the second through groove 151, and the third through groove 152.

In some embodiments, the position restorating device (not shown in the figure) includes a first magnet (not shown), the first magnet (not shown) is disposed on the longitudinal jaw 14.

A second magnet (not shown in the figure), the second magnet (not shown in the figure) is disposed on an inner side wall of the cover 12, the second magnet (not shown in the figure) and the first magnet opposite poles of a magnet (not shown).

The third magnet (not shown) is disposed on the inner side wall of the cover 12 and directly below the second magnet (not shown). Opposite poles of the third magnet (not shown) and the first magnet (not shown) have the same poles.

When the longitudinal clamping jaw 14 moves downward, the first magnet (not shown) and the third magnet (not shown) are oppositely arranged. Due to the same polarity repulsion, when the mobile phone is removed, the repulsive force under the action, the longitudinal clamping jaw 14 moves upward, and finally the longitudinal clamping jaw 14 is retracted into the installation chamber 13 by the effect of the first magnet (not shown) and the second magnet (not shown) in the longitudinal clamping jaw 14.

In some embodiments, the cover 12 is provided with a second magnet mounting groove 121 and a third magnet mounting groove 122, which cooperate with the second magnet (not shown) and the third magnet (not shown) respectively.

In some embodiments, after the longitudinal jaw 14 moves downwards into position, the axes of the third magnet (not shown) and the first magnet (not shown) are not on the same straight line, and the axis of the third magnet (not shown) is located below the axis of the first magnet (not shown).

In some embodiments, the longitudinal clamping jaw 14 is provided with a first magnet mounting groove 142 that cooperates with the first magnet (not shown).

In some embodiments, the first magnet mounting groove 142 is disposed on a side of the longitudinal jaw 14 opposite to the bottom shell 11.

In some embodiments, the cover 12 is provided with at least one reinforcing rib 123.

In some embodiments, a buffer layer 17 is provided on the outer surface of the cover 12.

In some embodiments, the position restorating device (not shown in the figure) is a spring disposed between the longitudinal jaw 14 and the installation chamber 13, and is configured to apply a retracted force to the longitudinal jaw 14 to retract into the installation chamber 13.

To sum up, the present disclosure adopts the design of the fixing seat 20, and the fixing seat 20 is placed in the slot of placing water cup, and the holder is fixed by the slot of placing water cup, which greatly facilitates the fixing of the mobile phone holder. The size adjusting sleeve 30 is designed to make the holder suitable for different models.

It is to be understood that the application of the present disclosure is not limited to the examples described above, and that modifications or variations may be suggested to persons skilled in the art in light of the above teachings, all of which are to be included within the scope of the appended claims.

What is claimed is:

1. A vehicle-mounted mobile phone holder comprising:
   a holder body; and
   a fixing seat is connected to the holder body and cooperates with a slot for placing water cup on the side of the driving position;
   wherein the holder body comprises:
   bottom shell,
   a cover, the cover and the bottom shell cooperate to form an installation chamber therebetween;
   a longitudinal clamping jaw, one end of the longitudinal clamping jaw is disposed in the installation chamber, and the other end protrudes outside the installation chamber, and is configured to support the bottom of the mobile phone placed vertically;
   at least two lateral clamping jaws, one end of the lateral clamping jaw is disposed in the installation chamber to cooperate with the longitudinal clamping jaw, and the other end protrudes out of the installation chamber to clamping the side wall of the mobile phone; and
   a position restorating device, which is disposed between the longitudinal jaw and the installation chamber, and is configured to apply a force retracting toward the installation chamber to the longitudinal jaw protruding out of the installation chamber; or the position restorating device is arranged between the lateral clamping jaw and the installation chamber, and is configured to apply a force retracting toward the installation chamber to the longitudinal clamping jaw protruding out of the installation chamber;

when the mobile phone is placed on the longitudinal clamping jaw, under the effect of the weight of the mobile phone, the longitudinal clamping jaw is driven to move downward, and the lateral clamping jaw is clamped inward to clamp the side wall of the mobile phone; when the mobile phone is removed, under the effect of the position restorating device, the longitudinal jaw moves upward and retracts into the installation chamber; and wherein the position restorating device comprises:

a first magnet is disposed on the longitudinal clamping jaw;

a second magnet disposed on an inner side wall of the cover, opposite poles of the second magnet and the first magnet are opposite poles; and a third magnet, the third magnet being disposed on an inner side wall of the cover and directly below the second magnet; opposite poles of the third magnet and the first magnet are the same poles;

when the longitudinal clamping jaw moves downward, the first magnet and the third magnet are oppositely disposed; Due to the same polarity repulsion, when the mobile phone is removed, the longitudinal clamping jaw moves upward under the effect of the repulsive force, and finally the longitudinal clamping jaw is retracted into the installation chamber under the effect of the first magnet and the second magnet.

2. The vehicle-mounted mobile phone holder according to claim 1, wherein the fixing seat further comprises:

at least one size adjusting sleeve, the size adjusting sleeve is arranged outside the fixing seat and is configured to adjust the outer diameter of the fixing seat.

3. The vehicle-mounted mobile phone holder according to claim 2, wherein the size adjusting sleeve is provided with at least one force groove for facilitating removal of the size adjusting sleeve.

4. The vehicle-mounted mobile phone holder according to claim 3, wherein the force groove is provided on a bottom surface or a side surface of the size adjusting sleeve.

5. The vehicle-mounted mobile phone holder according to claim 4, wherein the force groove is oval.

6. The vehicle-mounted mobile phone holder according to claim 1, wherein the holder body and the fixing seat are rotationally connected.

7. The vehicle-mounted mobile phone holder according to claim 1, wherein a first through slot is provided in the longitudinal clamping jaw along a longitudinal direction of the longitudinal clamping jaw and cooperates with a screw mounting column in the installation chamber to be longitudinally movement along the screw mounting column.

8. The vehicle-mounted mobile phone holder according to claim 1, wherein the cover is provided with a second magnet mounting groove and a third magnet mounting groove matched with a second magnet and a third magnet respectively.

9. The vehicle-mounted mobile phone holder according to claim 1, wherein after the longitudinal clamping jaw moves down into position, the axes of the third magnet (not shown) and the first magnet are not on the same straight line, and the axis of the third magnet is located below the axis of the first magnet-.

10. The vehicle-mounted mobile phone holder according to claim 1, wherein the longitudinal clamping jaw is provided with a first magnet mounting groove that cooperates with the first magnet.

11. The vehicle-mounted mobile phone holder according to claim 10, wherein the first magnet mounting groove is provided on a side of the front jaw opposite to the bottom shell.

12. The vehicle-mounted mobile phone holder according to claim 1, wherein at least one reinforcing rib is provided inside the cover.

13. The mobile phone holder of claim 1, wherein a buffer layer is provided on an outer surface of the cover.

14. The vehicle-mounted mobile phone holder according to claim 1, wherein the position restorating device is a spring disposed between the longitudinal jaw and the installation chamber, and is configured to apply a retracted force to the longitudinal jaw to retract into the installation chamber.

15. A vehicle-mounted mobile phone holder comprising:

a holder body; and a fixing seat is connected to the holder body and cooperates with a slot for placing water cup on the side of the driving position;

wherein the holder body comprises:

bottom shell, a cover, the cover and the bottom shell cooperate to form an installation chamber therebetween;

a longitudinal clamping jaw, one end of the longitudinal clamping jaw is disposed in the installation chamber, and the other end protrudes outside the installation chamber, and is configured to support the bottom of the mobile phone placed vertically;

at least two lateral clamping jaws, one end of the lateral clamping jaw is disposed in the installation chamber to cooperate with the longitudinal clamping jaw, and the other end protrudes out of the installation chamber to clamping the side wall of the mobile phone; and a position restorating device, which is disposed between the longitudinal jaw and the installation chamber, and is configured to apply a force retracting toward the installation chamber to the longitudinal jaw protruding out of the installation chamber; or the position restorating device is arranged between the lateral clamping jaw and the installation chamber, and is configured to apply a force retracting toward the installation chamber to the longitudinal clamping jaw protruding out of the installation chamber;

when the mobile phone is placed on the longitudinal clamping jaw, under the effect of the weight of the mobile phone, the longitudinal clamping jaw is driven to move downward, and the lateral clamping jaw is clamped inward to clamp the side wall of the mobile phone; when the mobile phone is removed, under the effect of the position restorating device, the longitudinal jaw moves upward and retracts into the installation chamber;

wherein a first clamping post is provided at the connection between the upper end of the longitudinal clamping jaw and the lateral clamping jaw; a second clamping post is provided at the a connection where the installation chamber and the lateral clamping jaw cooperate; a second through groove matching the first clamping post is provided on the lateral clamping jaw, a third through groove that is matched with the second clamping post is provided on the lateral clamping jaw;

when the longitudinal clamping jaw moves downward, the lateral clamping jaw is clamped inward with the cooperation of the first clamping post, the second clamping post, the second through groove and the third through groove.

\* \* \* \* \*